United States Patent
Meyer

[11] 3,955,932
[45] May 11, 1976

[54] INERT GAS GENERATOR

[75] Inventor: Georg Michael Meyer, Meerbusch Langst-Kierst, Germany

[73] Assignee: Deutsche Babcock & Wilcox Aktiengesellschaft, Oberhausen, Germany

[22] Filed: Dec. 11, 1973

[21] Appl. No.: 425,685

[30] Foreign Application Priority Data
Dec. 13, 1972  Germany............................ 2260871

[52] U.S. Cl.................................. 23/281; 55/233; 55/260; 261/98
[51] Int. Cl.².............................................. B01J 7/00
[58] Field of Search............. 23/281, 277 R, 277 C; 55/233, 260; 261/98

[56] References Cited
UNITED STATES PATENTS

| | | |
|---|---|---|
| 2,494,145 | 1/1950 | Sanderson et al. .................... 23/281 |
| 2,729,546 | 1/1956 | Williamson .......................... 23/281 |
| 3,151,187 | 9/1964 | Comte ................................. 55/233 |
| 3,768,234 | 10/1973 | Hardison.............................. 55/233 |

Primary Examiner—Morris O. Wolk
Assistant Examiner—Dale Lovercheck
Attorney, Agent, or Firm—Frank J. Jordan

[57] ABSTRACT

An inert gas generator arrangement in which a rotationally symmetric burner is substantially vertically oriented with respect to a cylindrical housing having within it a heatresistant steel cylindrical wall enclosing a firing chamber, the cylindrical housing having a funnel-shaped bottom and the lower edge of the firing chamber wall being disposed thereon. A cooling jacket surrounds the firing chamber wall to form a cooling arrangement. The cooling jacket is constructed in the form of a washing cooler.

5 Claims, 1 Drawing Figure

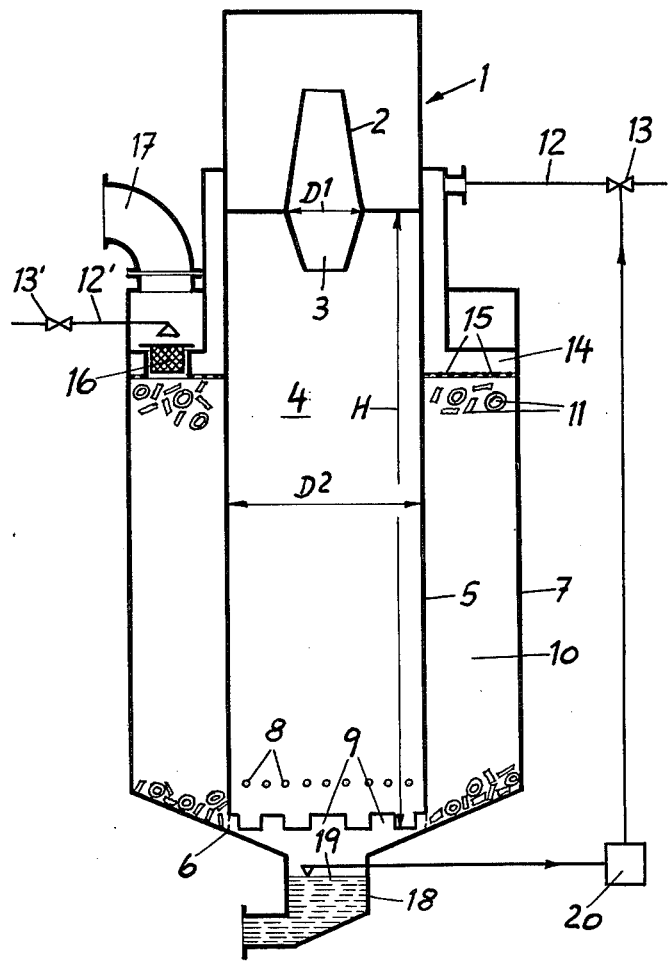

INERT GAS GENERATOR

BACKGROUND OF THE INVENTION

The present invention relates to an inert gas generator having a burner, a flame or firing chamber, and a cooling arrangement for the generated inert gas.

In the transportation of combustible fluids or explosive gases on ships, large quantities of inert gas are necessary. The inert gas is, for example, admitted into tanks during or after discharge, for the purpose of preventing explosions. Furthermore, the storage tanks for storing natural gas or manufactured gas are constructed with double walls, and the resultant intermediate chamber is filled with inert gas. Under normal pressure, these gases held in the storage tanks may be transported in liquid form under appropriately low temperatures.

Since it has not been found economical to take along inert gas in storage tanks on board ships, fuel tankers have been equipped with inert gas generating equipment. In such equipment the liquid or gas combustibles such as diesel oil used also for ship propulsion are burned as completely as possible, so that the gas generated in this manner contains only thereafter carbon dioxide and nitrogen. The additional components as, for example, oxygen, carbon monoxide and sulphur dioxide, are either negligible in quantity or are removed by the washing processing following the combustion or burning. A general requirement for such an inert gas generating arrangement is that it must consume as little space as possible, so that the loading or cargo space of the ship is not unnecessarily reduced thereby.

Inert gas generating arrangements are known in the art in which a horizontally oriented cooling jacket surrounds a burning chamber which connects to a washing cooler. But such known arrangements are complex in design and are substantially large so that they occupy valuable space aboard ship.

Accordingly, it is an object of the present invention to overcome the disadvantages of known prior art arrangements and to provide an inert gas generator having a burner, a flame or firing chamber, and a cooling arrangement for inert gas, which is simple in design and requires substantially little space.

Another object of the present invention is to provide an inert gas generating arrangement of the foregoing character which may be economically fabricated and readily maintained.

The objects of the present invention are achieved by providing a rotationally symetric burner in substantially vertical relationship to a cylindrical flame or firing chamber. A cooling arrangement is provided, in accordance with the present invention, by a cooling jacket surrounding the flame or firing chamber. The cooling jacket is, furthermore, constructed in the form of a washing cooler. By constructing the inert gas generator in this manner a compact unit is obtained, and the burning as well as the cooling and washing of the generated inert gas is also realized. As a result, the inert gas requires only a drying process prior to being used.

A particularly advantageous embodiment of the present invention is obtained when the inert gas generator has a burner in which the cross section first widens and then narrows down again in longitudinal direction, so that the diameter of the flame or firing chamber is substantially 2.5 to 4.5 times larger than the largest diameter of the burner. The height of the flame or firing chamber is also to be substantially 1.5 to 3.5 times larger than its diameter. By taking into account the dimensions in the size of the inert gas generator, substantially good burning is obtained in the flame or firing chamber and sufficient cooling of the gases occurs prior to entrance in the washing cooler.

An advantageous construction of the inert gas generator in accordance with the present invention, furthermore, results when the washing cooler has an outer symmetrical housing with a cone or funnel-shape bottom and a cylindrical insert forming the flame or firing chamber. In the region below the lower edge of the insert, openings are provided for the passage of the gas and the washing order. In such construction of the present invention, the insert can be supported by the cone or funnel-shaped bottom.

The novel features which are considered as characteristic for the invention are set forth in particular in the appended claims. The invention itself, however, both as to its construction and its method operation, together with additional objects and advantages thereof, will be best understood from the following description of specific embodiments when read in connection with the accompanying drawing.

SUMMARY OF THE INVENTION

An inert gas generator includes a rotationally symetric burner and a cylindrical firing chamber arranged vertically with respect to the burner. A cooling jacket surrounds the burner for forming a cooling arrangement constituting a washing cooler.

BRIEF DESCRIPTION OF THE DRAWING

The accompanying drawing is a schematic diagram of an inert gas generator equipped with a burner, a flame or firing chamber, and a cooling arrangement in accordance with the present invention.

DESCRIPTION OF THE PREFERRED EMBODIMENTS

Referring now to the drawing, the upper portion of the inert gas generator 1 in accordance with the present invention has a burner 2 which is supplied with fuel and air by means of supply lines. The burner 2 has a cross section which first widens or broadens and then becomes narrower in longitudinal direction. The largest diameter is denoted by $D_1$. The entrance 3 of the burner 2 is directed downwardly to a flame or firing chamber 4. The diameter of the flame or firing chamber 4 is designated by $D_2$ and its height is designated by H.

The flame or firing chamber 4 is constructed of an insert 5 which is supported by a funnel-shaped bottom 6 of an outer housing 7. The lower edge of the insert 5 is provided with openings 8 for the gas and also with recesses 9 for the washing water.

The chamber formed by the insert 5 and the outer housing 7 serves as the washing cooler 10 for the gas passing out of opening 8. The ring-shaped chamber is, for this purpose, filled substantially with Pall rings 11. The admission of the washing water is through a conduit 12 connected to a regulating valve 13 as well as to a circular-shape water box 14 which is provided with screen-type water holes. Filters 16 are provided in one part of the water box 14. The washed inert gas exits through the connecting conduit 17. The filters are cleaned by rinsing water through the line 12' connected in series with a shut-off valve 13'.

The funnel-shaped bottom 6 of the housing 7 terminates in a connecting pipe 18. A water column 19 is maintained in this connecting pipe 18 during the operation of the inert gas generator. A regulating arrangement 20 is used to maintain the water column 19 at the desired height.

In accordance with the present invention, sufficient burning and cooling of the gas in the flame chamber 4 is assured when the dimensions are held so that $D_1$ to $D_2$ is in the ratio of 1 to 2.5–4.5, and $D_2$ to $H$ is in the ratio of 1 to 1.3–3.5. The ring chamber surrounding the flame chamber 4 serves simultaneously as a cooling jacket for the flame chamber and also as a washing cooler for the gas which passes through the openings 8. The undesired particulate matter is deposited from the raw gas onto the Pall rings in the conventional manner. Such particulate matter or undesirable constituents or components in the gas, particularly $H_2S$ and $SO_2$ are then removed by water which is in the form of sea water when out at sea.

The washing cooler operates in a particularly satisfactory manner. During experimentation it was determined, for example, that with 2% of sulphur in the fuel, which corresponds to approximately 1200 ppm $SO_2$ in the raw gas, less than 5 ppm $SO_2$ remain in the gas after washing in the washing cooler. In addition, the gas is cooled by substantially 2° to 5°C above the cooling medium entrance temperature.

The water holes 15 in the water box 14 have a predetermined diameter so that substantial pressure losses do not result. The diameter and the number of filters 16 in the water box 14, furthermore, are selected so that the sum of their cross sections are from 5 to 15 times the cross section of the connecting pipe 17.

The water closure in the lower connecting pipe 18 of the inert gas generator has the advantage that it is able to maintain easily an interior pressure of, for example, 20mm Hg above atmospheric pressure. In addition with the aid of a regulating arrangement 20, the water inlet can be controlled, if desired, through the valve 13 and conduit 12. It is also possible to construct the regulating arrangement 20 in the form of an alarm emitter in the event that the burner or washing water become inoperative.

From the viewpoint of the corrosive effects of sea water, it is advantageous that the water cooler may be entirely emptied through the bottom pipe connection 18.

The insert 5 which forms the flame chamber is advantageously constructed when made of heat resistant steel. With such construction, a wall lining may be advantageously omitted. The material used for the housing of the washing cooler is best constructed from acid resistant steel. With such design and construction, long operating life of the arrangement, in accordance with the present invention, may be obtained.

While the invention has been described by means of specific examples and in specific embodiments, it is not intended to be limited thereto, for obvious modifications will occur to those skilled in the art without departing from the spirit and scope of the invention.

What is claimed is:

1. An inert gas generator comprising a cylindrical housing having its axis vertically disposed, a cylindrical firing chamber enclosed by a cylindrical firing chamber wall of heat resistant steel within said housing having a diameter smaller than the diameter of said housing to thereby define an annular chamber between said firing chamber wall and said housing, said annular chamber having an upper end portion and a lower end portion, said firing chamber wall having an upper end portion and a lower end portion, said lower end portion of the firing chamber wall having a lower edge, a rotationally symmetric burner having a vertically disposed axis, said burner being located above said cylindrical firing chamber and having a burner tip directed downwardly into said firing chamber, means for supplying combustibles to said burner, said firing chamber wall having a diameter greater than the diameter of said burner, communicating means at said lower end portion of said firing chamber wall providing communication between said firing chamber and said annular chamber such that inert gas can pass from said firing chamber to said annular chamber, a wash water inlet means at said upper end portion of said annular chamber, said cylindrical housing having a funnel-shaped bottom having a central wash water outlet, said lower edge of said firing chamber wall being disposed on said funnel-shaped bottom of said cylindrical housing such that said firing chamber wall is thereby supported on said funnel-shaped bottom, said lower edge of said firing chamber wall having recesses for passing wash water from said lower end portion of said annular chamber to said wash water outlet, and a gas outlet means at said upper end portion of said annular chamber.

2. An inert gas generator as defined in claim 1 wherein said burner has a cross section which widens and then narrows along the longitudinal direction of said burner, the diameter of said firing chamber being 2.5 to 4.5 times larger than the largest diameter of said burner, the height of said firing chamber being substantially 1.5 to 3.5 times larger than the diameter of said firing chamber.

3. An inert gas generator as defined in claim 1 including Pall rings in said annular chamber.

4. An inert gas generator according to claim 1 wherein said gas outlet means comprises a gas outlet port on said housing and filters disposed at the upper portion of said annular chamber said filters having a cross-sectional area 5 to 15 times greater than the cross-sectional area of said gas outlet port.

5. An inert gas generator according to claim 4 wherein said wash water inlet means includes a ring-shaped water box, said water box having a bottom plate with openings therein for the passage of water to said annular chamber, said filters being disposed in said water box.

* * * * *